Figures 1, 2, 2A, 2B:
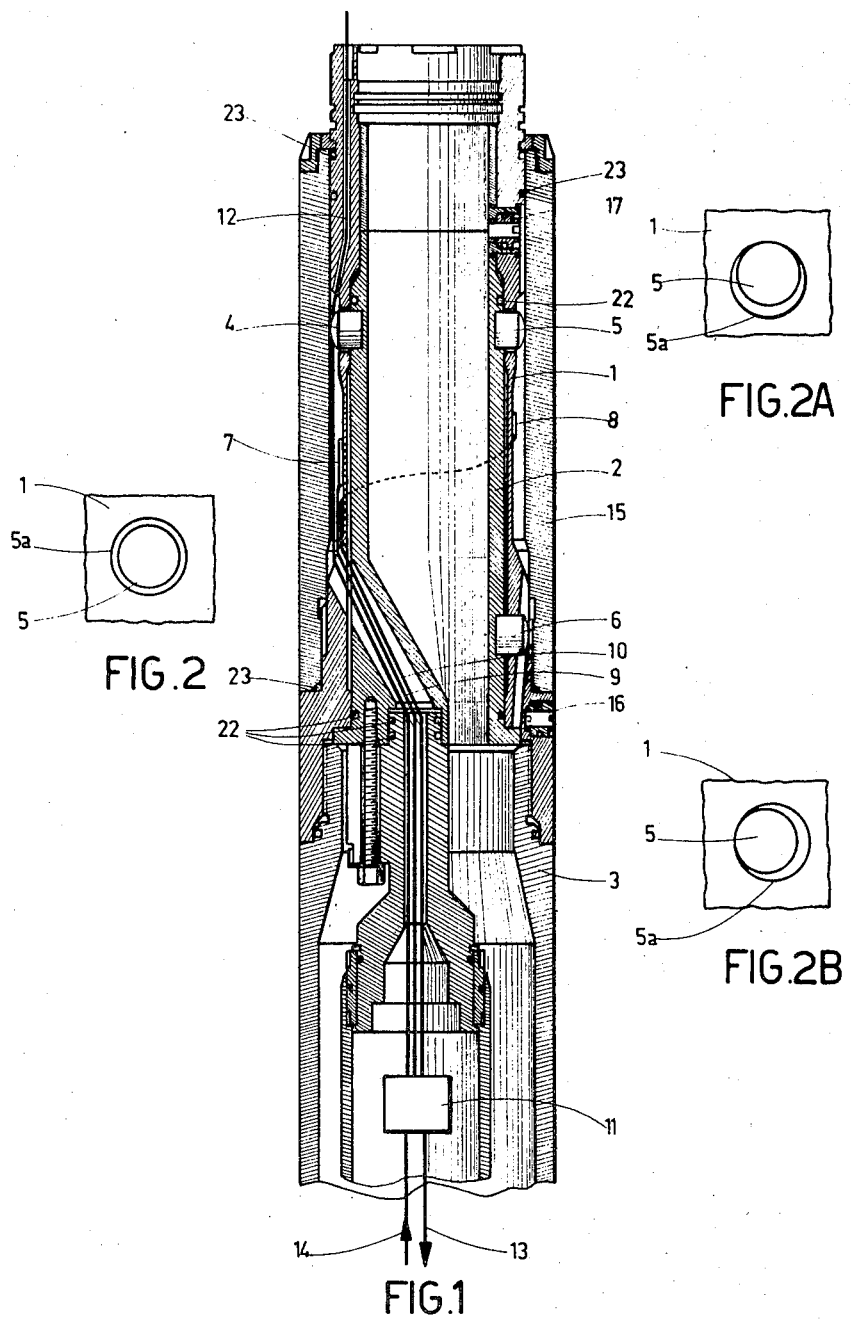

United States Patent
Chatard et al.

[15] 3,686,942
[45] Aug. 29, 1972

[54] DRILLING COLUMN COMPRISING A DEVICE FOR MEASURING STRESSES EXERTED ON THE COLUMN

[72] Inventors: Michel Chatard, Chatou; Remi Reynard, Montesson, both of France

[73] Assignee: Institut Francais due Petrole, des Carburants et Lubrifiants, Rueil-Malmaison (Hauts de Seine), France

[22] Filed: April 20, 1970

[21] Appl. No.: 30,086

[52] U.S. Cl. ................................. 73/151, 73/88.5 R
[51] Int. Cl. ................................ E21b 47/00
[58] Field of Search ....... 73/88.5 R, 133, 141 A, 151, 73/136 A

[56] References Cited

UNITED STATES PATENTS

| | | | |
|---|---|---|---|
| 2,775,887 | 1/1957 | Hines | 73/141 A |
| 2,795,134 | 6/1957 | Weber et al. | 73/141 A |
| 2,877,646 | 3/1959 | Dudenhausen | 73/141 A |
| 3,376,921 | 4/1968 | Manry et al. | 73/151 X |
| 3,439,541 | 4/1969 | Gilder | 73/141 A |

FOREIGN PATENTS OR APPLICATIONS

| | | | |
|---|---|---|---|
| 587,096 | 4/1947 | Great Britain | 73/141 A |
| 918,338 | 2/1963 | Great Britain | 73/136 A |
| 1,122,742 | 1/1962 | Germany | 73/136 A |

*Primary Examiner*—Charles A. Ruehl
*Attorney*—Craig, Antonelli and Hill

[57] ABSTRACT

A strain measuring device adapted to a drill pipe, comprising in combination a deformable member, sensitive to the action of strains applied to the pipe in at least one direction and provided with means for detecting these strains, connected to conductors for remote measuring associated to the drill pipe, a safety element capable of withstanding accidentally high values of these strains, and connecting means between said member and said element, adapted to permit a limited displacement of said deformable sensitive member in said direction with respect to said safety element, as a result of the application of the strains said sensitive member coming into abutment against said safety element, when the value of the strain in said direction exceeds a predetermined limit value.

5 Claims, 11 Drawing Figures

Patented Aug. 29, 1972

3,686,942

3 Sheets-Sheet 1

INVENTORS
MICHEL CHATARD and
REMI REYNARD

BY Craig, Antonelli & Hill

ATTORNEYS

Patented Aug. 29, 1972
3,686,942
3 Sheets-Sheet 2
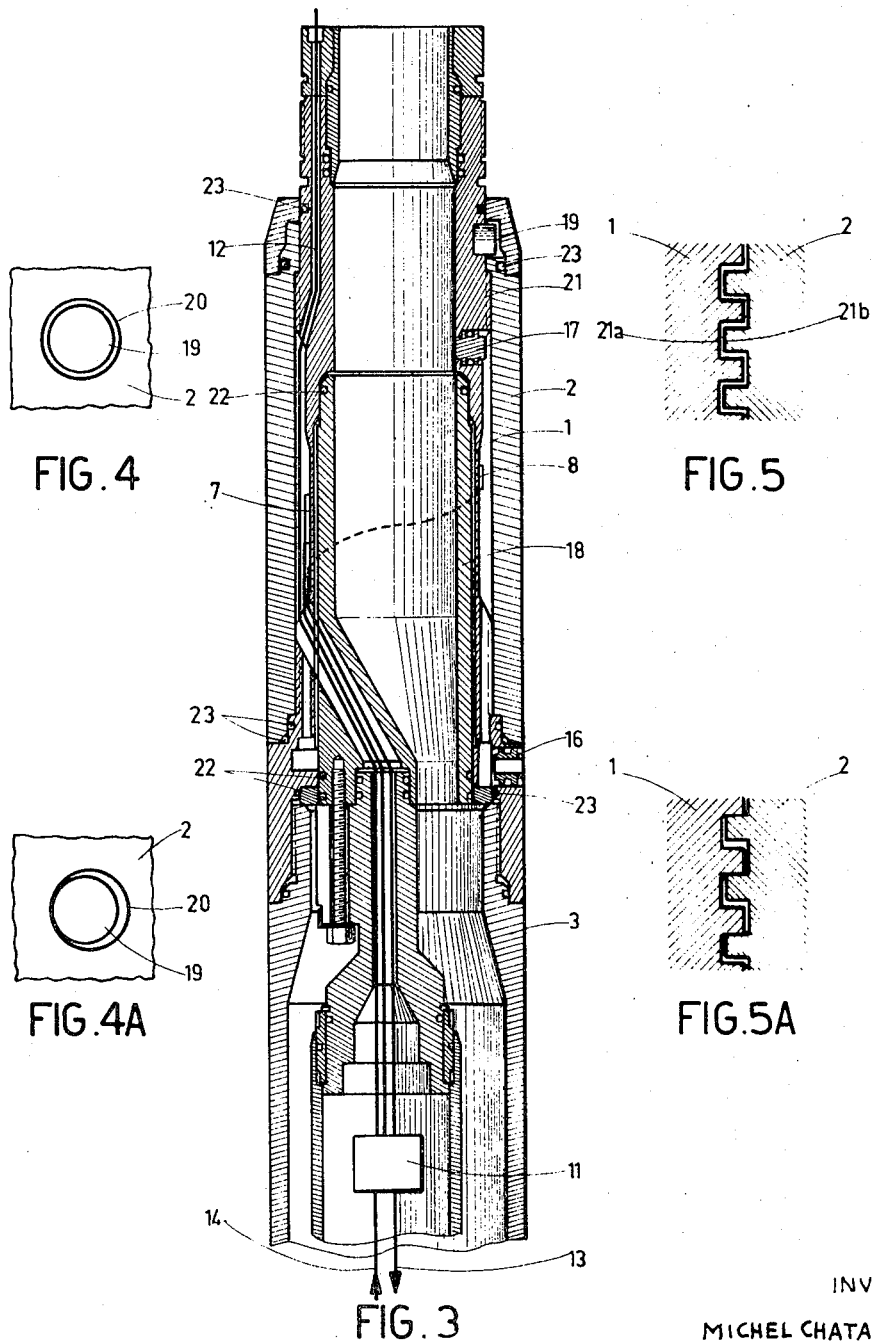
INVENTORS
MICHEL CHATARD and
REMI REYNARD
BY Craig, Antonelli & Hill
ATTORNEYS Patented Aug. 29, 1972

3,686,942

3 Sheets-Sheet 3

INVENTORS
MICHEL CHATARD and
REMI REYNARD

BY Craig, Antonelli + Hill

ATTORNEYS

DRILLING COLUMN COMPRISING A DEVICE FOR MEASURING STRESSES EXERTED ON THE COLUMN

The present invention relates to a device for remotely controlling and measuring the strains exerted on a drill pipe.

This device is suitable for remotely measuring strains due to tractive and bending forces, as well as those resulting from torques exerted on the drill pipe.

The remote measuring of the strains applied to a drill pipe can be effected by placing on this pipe, or more generally on a support member integral therewith, strain sensitive devices such as strain gauges.

Unfortunately, the sensitivity of such a detecting system is not sufficient unless the element whereon the strain gauges are located is deformable enough in operation, under the action of the applied strains.

This aptitude to deformation which can be obtained by a suitable selection of the material constituting the support member at the place where the strain gauges are located, and by a reduction of its cross-section, is a requirement which is often hardly compatible with the requirement of a sufficient mechanical strength of this deformable member, this mechanical strength being absolutely necessary since this element is a part of a drill pipe subjected to high strains and its breaking could have serious consequences.

The main object of the invention is accordingly to provide a device adapted to a drill pipe and exhibiting both a high sensitivity relative to the action of the strains and a mechanical strength which is sufficient for withstanding quite safely a high accidental increase in these strains.

This object is achieved, according to the invention, with a strain measuring device comprising in combination a deformable member connected to the drill pipe, said member being sensitive to strains applied to the pipe along at least one direction and being provided with means for detecting these strains, connected to conductors for remote measuring, associated with the drill pipe, a safety element capable of withstanding accidentally high values of these strains and connecting means between said deformable member and said safety element, adapted to provide for a limited displacement of said sensitive member in said direction, relative to said safety element, as a result of a deformation of said sensitive member due to the effect of the strains, said sensitive member coming into abutment against said safety element when the value of the strain along said direction becomes greater than a predetermined value.

Said connecting means may for example comprise at least one pin connecting said sensitive member and said safety element and limiting the displacement of said sensitive member and/or said safety element, relative to said pin.

In another embodiment said sensitive member and safety element will be connecting by screwing, using two complementary threadings allowing a limited relative displacement of said sensitive member and safety element in at least one direction, under the action of strains applied to the sensitive member.

The sensitive member and the safety element will advantageously consist of two coaxial tubular elements, respectively connected to the upper and the lower sections of the pipe, the safety element being preferably placed around the sensitive member, so that the wall thickness of the safety element, which is greater than that of the sensitive member, do not result in a reduction of the passage cross-section provided for the flow of drilling fluid through the pipe, at the place of location of the remote measuring device.

Figure 6:
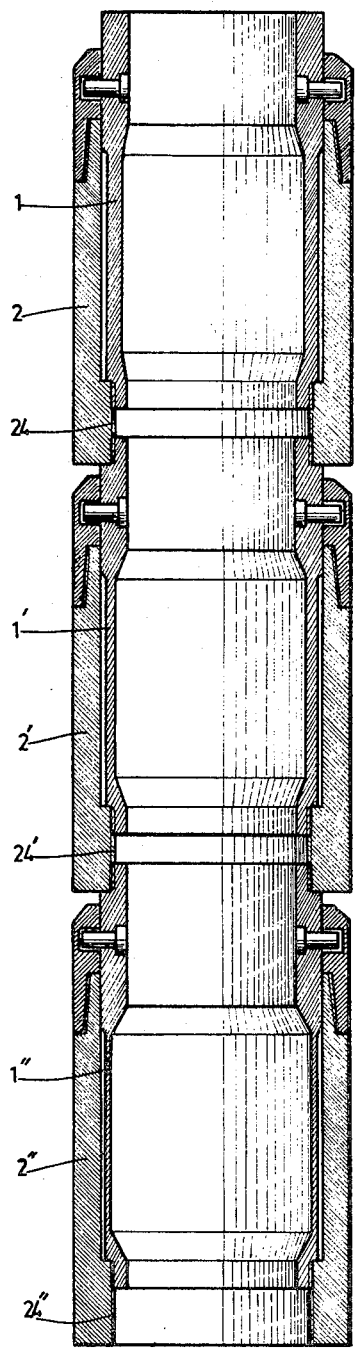
Figure 6A:
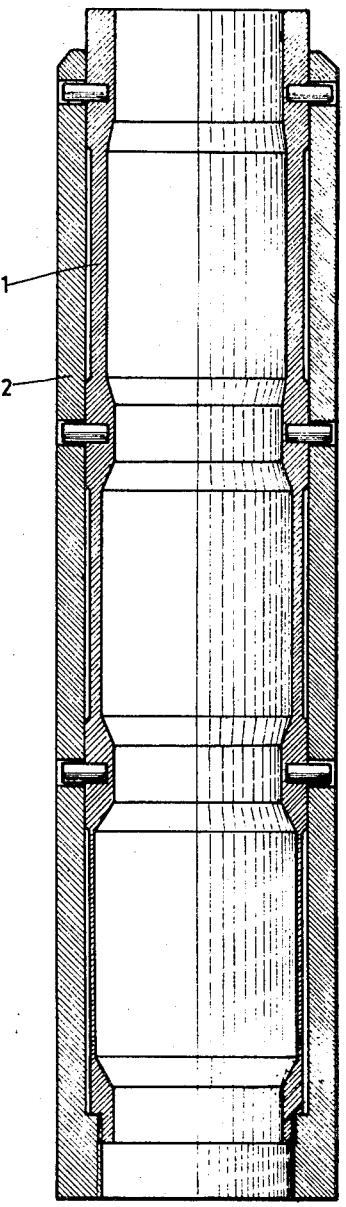

Some non-limitative embodiments of the invention are described hereinunder with reference to the appended drawings, wherein:

FIG. 1 illustrates a first embodiment of the invention,

FIG. 2 shows the position of a pin connecting the safety element and the sensitive member for the value zero of the strain applied to the latter, FIG. 2A shows a connecting pin in abutment against the safety element when the traction strain reaches a predetermined limit, FIG. 2B shows similarly the limit position of a connecting pin when the torque becomes greater than a selected value, FIG. 3 illustrates an alternative embodiment for the device of FIG. 1, FIGS. 4 and 4A are relative to this alternative embodiment and illustrate an arrangement similar to that shown in FIGS. 2 and 2B respectively, FIGS. 5 and 5A illustrate other means for providing a relative axial play between the sensitive member and the safety element of the device, and FIGS. 6 and 6A represent schematically the arrangement of the measuring and safety elements.

Throughout the different drawings, the same reference numerals have been used for designating similar elements.

In FIG. 1, illustrating a first embodiment of a device for remotely measuring strains exerted at a point of a flexible pipe, the reference numeral 1 designates a member adapted to be connected at its upper end to a first section of the pipe. This sensitive member consists of a sleeve of small thickness and accordingly is relatively deformable under the action of traction forces and/or torques exerted on the pipe. The reference numeral 2 designates the safety element which consists of a tube of greater wall thickness, connected to a second section of the pipe, indicated by reference numeral 3.

In this embodiment, the connecting means between the elements 1 and 2 consists of pins, such as pins 4, 5 and 6, fast with the safety element 5 and inserted through holes 5a, each of which offering to the pin passing therethrough a limited play in at least one direction (the holes 5a may be circular, as shown with a greater diameter than that of the pins, or ovalized in one direction).

In these conditions, the member 1 is freely deformable under the action of strains applied to the pipe, as long as a strain in a determined direction, due for example to a traction force (FIG. 2A) or to a torque (FIG. 2B) applied to the pipe, does not reach a fixed limit.

When this limit is reached, one at least of the pins comes into abutment against the edge of a hole 5a, whose outline has been determined as a function of the limit value permitted for the deformation of the sensitive element under the action of the strains, in each direction of these strains.

For example this limit will be 30 tons for the traction forces or axial loads and 400 kg.m for the torques applied to the drill pipe, these values being of course indicated only by way of example.

When this limit has been reached, the safety element 2 takes up a part of the loads which beyond this limit were sustained solely by the sensitive member 1. In case of an accidental breaking of this member, the safety element would wholly sustain the loads transmitted between the two pipe sections connected by the device according to the invention.

The deformations of the sensitive member are detected by strain gauges which may be of a known type, such as gauge 7 secured to the cylindrical sensitive member 1 along a generatrix thereof, this gauge being sensitive to the axial elongation of this member, resulting from traction strains, and gauge 8 placed at right angles to a generatrix of member 1 and sensitive to a twisting of this member.

Electric signals produced by these strains gauges are transmitted, through conductors 9 and 10 respectively, to electric circuits 11 for data or information processing, these circuits comprising in particular amplifying means which may be of a known type and transmit to the ground surface through cable 12 all the measurements to be carried out.

In the case where the drill pipe connected to the sensitive member 1 is a flexible pipe incorporating data transmitting conductors, the cable 12 may be connected to at least one of these conductors.

The electric power feeding the electric circuits 11 may be produced by batteries or supplied through conductors (not shown in the drawing) from a surface installation at the top of the well. Conductors 13 provide for the electric supply to other detecting devices, identical to or different from the above-described detecting device and which transmit data to the circuits 11 through cable 14.

Annular joints 22 provide for sealing between the safety element 2 and the sensitive member 1, with respect to the drilling fluid which flows through the drill pipe.

In the embodiment illustrated in FIG. 1, an external protecting sleeve 15 covers the sensitive element 1 and annular joints 23 provide for sealing with respect to the drilling fluid flowing through the drill pipe and through the annular zone between the wall of the drilled well and the protective sleeve. Due to the provision of the sealing joints 22 and 23, of a sufficient thickness of the safety element 2 and of the external protective sleeve 15, the sensitive member 1 is not subjected to the hydrostatic pressure difference between the exterior and the interior of the pipe and, consequently, the informations provided by the strain gauges 7 and 8, concerning the axial load and the torque applied to the drill pipe are not altered by this hydrostatic pressure difference.

Pressure indicating devices 16 and 17 which measure respectively the pressure within the pipe and in the annular zone around this pipe are connected to the electric circuits for data processing, through not shown electric conductors.

FIG. 3 wherein neither the strain gauges nor the electric conductors and circuits are shown, illustrates an embodiment wherein the safety element 2 is placed around the sensitive member 1.

An internal socket or protecting sleeve 18, provided with sealing joints 22 protects the sensitive member from the contact with the drilling fluid and the safety element 1 is here again shielded from the effect of the hydrostatic pressure difference between the interior and the exterior of the pipe, through the safety element 2 and the external sleeve 18, and the sealing joints 22 and 23.

This arrangement makes it possible to choose for the safety element 2 any wall thickness, without being limited by the minimum section of the passage required for the drilling fluid.

A pin 19, fast with the sensitive member 1, is inserted with some clearance through a hole 20 of the safety element 2, being adapted, as in the preceding element, to come in abutment against the edge of this hole when the torque applied to the drill pipe exceeds a predetermined limit value.

The sensitive member 1 and the safety element 2 are in this embodiment connected at 21 by means of complementary threadings 21a and 21b (FIGS. 5 and 5A) which are provided with some play or clearance, permitting a free extension of the sensitive member 1 under a tractive force, this member coming however in abutment against the safety element 2 when the tractive force (having for example the direction indicated by the arrow in FIG. 5A) reaches a predetermined limit value, which depends on the traction strength of element 1.

It results from the foregoing that the invention provides a device for remote measuring which can be made very sensitive through a reduced thickness of the member 1, while complying with the necessary safety requirements, in view of the presence of the element 2 which can sustain all or part of the strains applied to the pipe.

It could be possible to measure with a high accuracy values varying within a wide range, by using an assembly of devices according to the invention connected in series, so that the sensitive member 1 of one of these devices is connected to the safety element of an adjacent device, these devices having sensitive members of increasing thicknesses, whose deformation would be limited, by means of pins or threadings, as above-indicated, to respective values increasing with the thickness of the sensitive member, so as to prevent any risk of breaking of the most brittle sensitive members in the so constituted series of devices according to the invention.

In FIG. 6, the measuring elements are shown at 1, 1' and 1'' while the corresponding safety elements are indicated at 2, 2' and 2''. As is apparent from this figure, the measuring element 1' is connected to the adjacent safety element 2 by any known means, such as for example a thread 24.

In FIG. 6A, the different safety elements have been assembled so as to constitute only a single safety element 2 and, in like manner, the measuring elements have been assembled in series with the aid of any known means so as to constitute a single measuring element 1 having portions with a decreasing cross section.

As already indicated, a device according to the invention, adapted to a drill pipe, may be made insensitive to the difference of hydrostatic pressure between the interior and the exterior of the pipe.

However, any element located in the flow of drilling fluid, downstream from the device according to the invention, such as a valve or a tubing for turbodrilling actuated by the drilling fluid, by generating a pressure drop, produces in operation a dynamic pressure increase in the flow of fluid, upstream from its location. This pressure difference results in an axial load applied to the pipe, which is combined with the axial load due to parameters other than the fluid flow and whose value has to be measured with the device according to the invention.

A correction of the measurement carried out on the ground surface can be easily achieved by subtracting from the measured value the quantity $\Delta_{Pi}$ S representing the product of the difference $\Delta_{Pi}$ of the values of the pressure inside the pipe respectively upstream and downstream from the location of the device generating the pressure drop by the useful or passage cross-section S provided by this device to the fluid flow.

The value of S may be determined by a prior calibration, by comparing the values indicated by the measuring device of the invention for the axial load applied to the pipe, respectively with and without circulation of drilling fluid, for a given flow rate of this fluid, before the drill bit is lowered onto the bottom of the drilled well, the value of the axial load applied to the sensitive member 1, in addition to the load resulting from the flow of fluid, being known and equal to the weight of the different elements associated to the pipe (drill bit, drill collar, possibly turbine for turbo-drilling) placed below the measuring device according to the invention.

The above-indicated correction may be carried out automatically by devices which may be readily designed by those skilled in the art, these devices including means for automatic adjustment as a function of the value of the above-defined cross-section S.

What we claim is:

1. A drilling column consisting of portions assembled end-to-end, comprising in combination
    a deformable tubular measuring element connected at one end thereof to a first column portion and at the other end thereof to a second column portion so as to assure the continuity of the drilling column, said measuring element having on one portion of the length thereof a predetermined section allowing for its deformation in at least one direction due to the action of the stresses applied to the drilling column, said portion of the measuring element being provided with detecting means for detecting these stresses, and telemetering conductors connected to said detecting means and operatively associated with the drilling pipe,
    a tubular safety element disposed coaxially with respect to said measuring element, said measuring and safety elements being joined together within each other with a play allowing for the relative displacement thereof during the deformation of the measuring element, said safety element being rigidly secured at one of the ends thereof to one of said drilling column portions, and
    connecting means linking the second of the ends of said safety element to said measuring element, said connecting means being adapted, during the deformation of the measuring element in said direction, to limit the displacement of said measuring element with respect to said safety element to a maximum value, said safety element having a predetermined section capable of supporting the high stresses applied to the drilling column when the relative displacement of said measuring and safety elements has reached said maximum value.

2. A drilling column according to claim 1, wherein said connecting means comprises at least one pin joining together said measuring element and said safety element, at least one of said elements being adapted to have a limited displacement with respect to said pin.

3. A drilling column according to claim 1, wherein said connecting means consists of complementary threads provided respectively on said measuring and safety elements, said threads joining together said elements with a play allowing for a limited relative displacement of said elements in at least one direction.

4. A drilling column according to claim 1, wherein said measuring element is shielded from the influence of the difference of the static pressure exerted by the drilling fluid between the internal wall and the external wall thereof by means of a tubular protecting element having a thickness sufficient to withstand the pressure difference and covering tightly at least one of the walls of said measuring element.

5. A drilling column according to claim 1, characterized by the assembly in series of several measuring elements connected to at least one safety element by distinct connecting means, said measuring elements having different thicknesses whose deformation due to the effect of stresses is limited by said connecting means to values increasing with the thickness of the measuring element.

* * * * *